United States Patent [19]

Sheng

[11] 4,310,910
[45] Jan. 12, 1982

[54] OPTIMAL POLARIZATION FOR THE OPTICAL READOUT OF HIGH DENSITY VIDEO RECORDING

[75] Inventor: Ping Sheng, Princeton, N.J.

[73] Assignee: RCA Corporation, New York, N.Y.

[21] Appl. No.: 33,265

[22] Filed: Apr. 25, 1979

[30] Foreign Application Priority Data

Sep. 19, 1978 [GB] United Kingdom ............. 37355178

[51] Int. Cl.$^3$ ........................... G11B 7/00; H04N 5/84
[52] U.S. Cl. .................................... 369/116; 369/121; 369/109; 369/106; 358/128.5
[58] Field of Search ...................... 358/127, 128, 128.5; 179/100.3 N, 100.3 GN, 100.3 P, 100.3 M, 100.3 V; 356/365; 350/157; 369/44, 46, 106, 109–111, 116, 121

[56] References Cited

U.S. PATENT DOCUMENTS

| | | |
|---|---|---|
| 3,562,422 | 2/1971 | McMann, Jr. ...................... 358/130 |
| 3,914,057 | 10/1975 | Smith et al. ...................... 356/365 X |
| 4,065,786 | 12/1977 | Stewart ............................... 358/128 |
| 4,093,961 | 6/1978 | Kanamaru ............... 179/100.3 N X |
| 4,100,577 | 7/1978 | Naruse et al. ........... 179/100.3 V X |
| 4,139,263 | 2/1979 | Lehureau et al. ................... 350/157 |
| 4,142,209 | 2/1979 | Hedlund et al. ..................... 358/128 |
| 4,160,270 | 7/1979 | Goldschmidt et al. ..... 179/100.1 G |

OTHER PUBLICATIONS

Firester, filed Sep. 1975, published in 869 O.G. 002, Dec. 7, 1976.

*Primary Examiner*—Aristotelis M. Psitos
*Attorney, Agent, or Firm*—E. M. Whitacre; J. S. Tripoli; J. E. Roehling

[57] ABSTRACT

Recovery from a record of data recorded in an elongated information track, comprising depressed areas of various lengths alternating with non-depressed areas, is effected by an optical playback system. The playback system employs apparatus for focusing a laser source as a light spot on the information track. A light detector, responsive to light diffracted by the information track as relative motion is established between the light spot and the information track, is used in the playback apparatus to translate the depressions in the information track into frequency-modulated electrical signals. When the light spot size or depression spacing becomes comparable to the wavelength of the laser source, the signal strength at the detector output becomes dependent upon the polarization of the light spot incident on the information track. In the playback system, apparatus is provided for orienting the polarization of the light spot on the information track to enhance the signal strength of the detector output.

2 Claims, 23 Drawing Figures

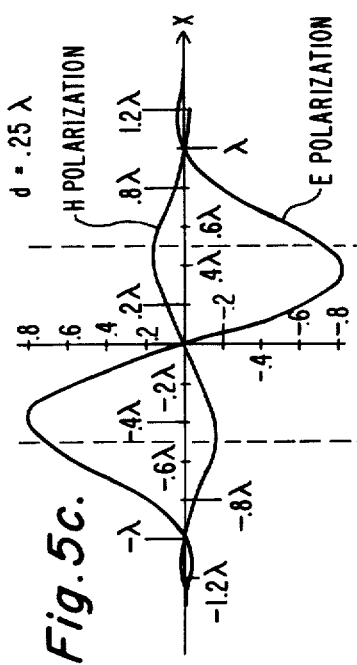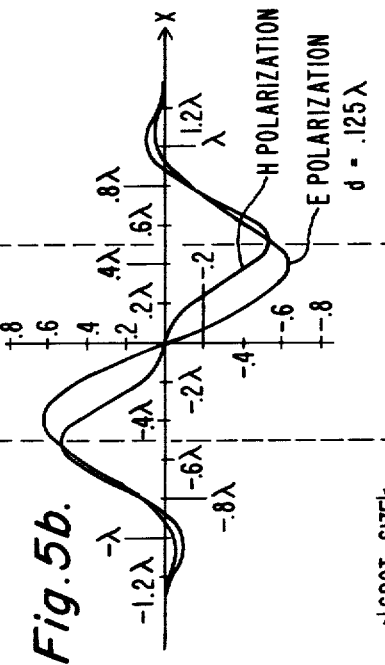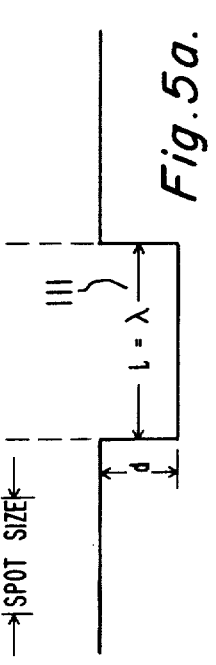
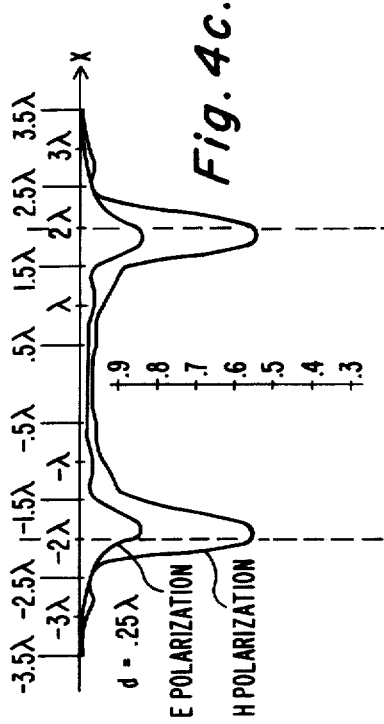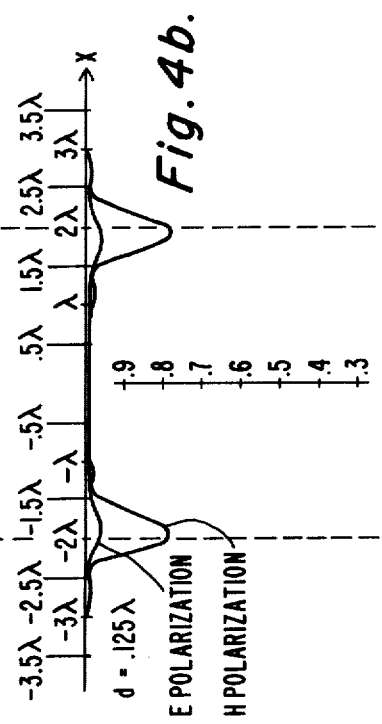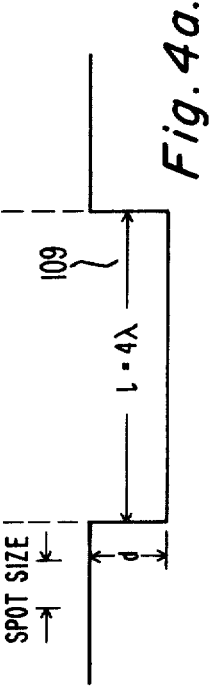
Fig.4a. Fig.4b. Fig.4c.
Fig.5a. Fig.5b. Fig.5c.

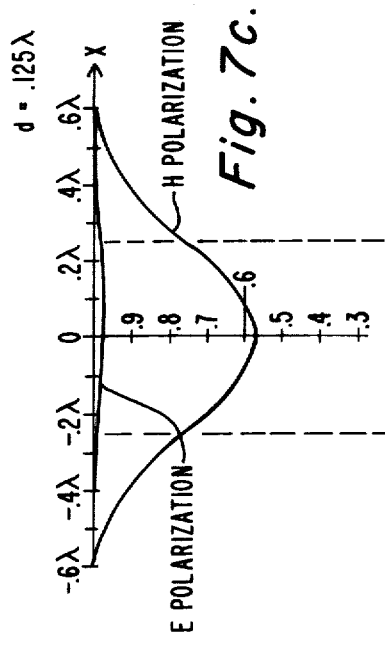
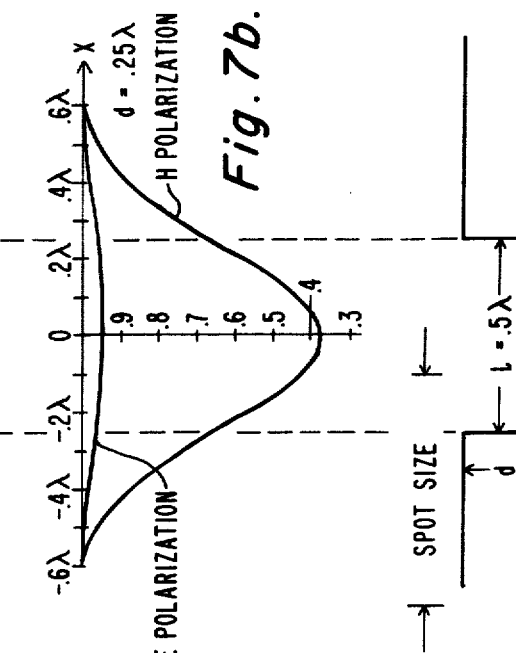
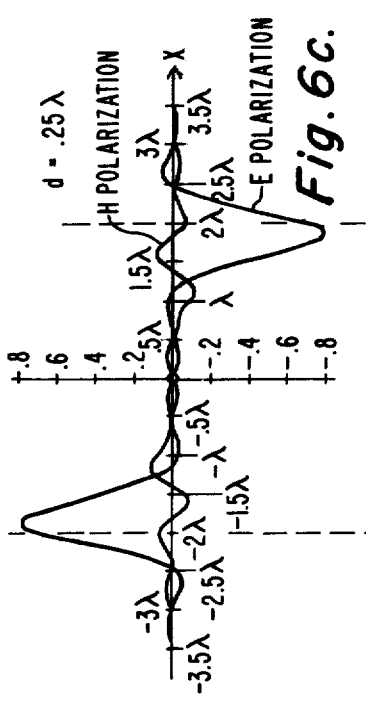
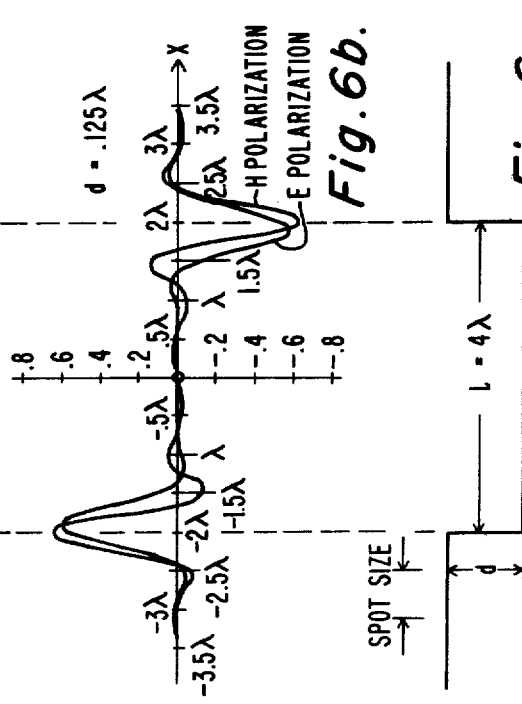
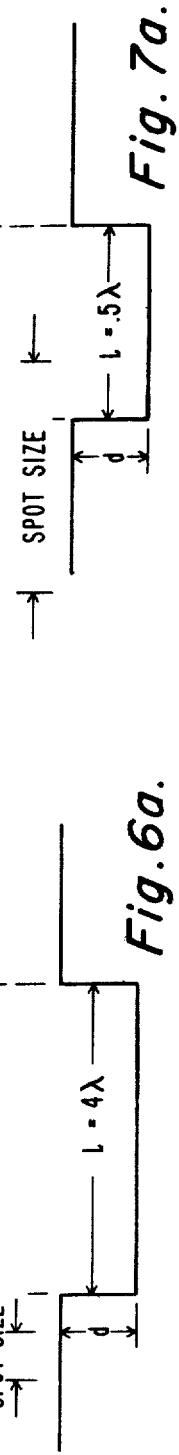

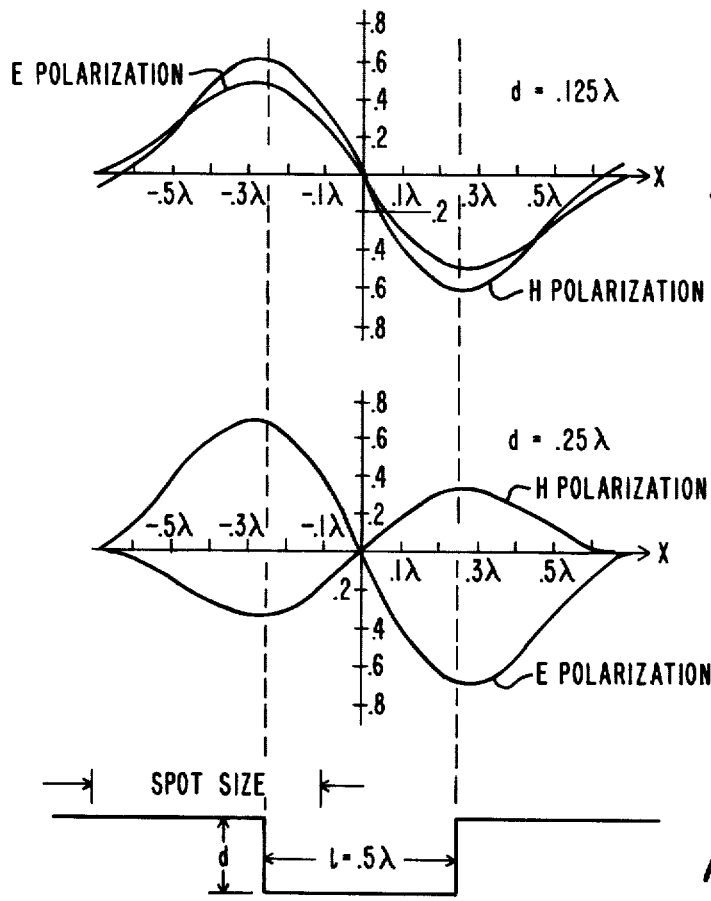
Fig. 8c.
Fig. 8b.
Fig. 8a.
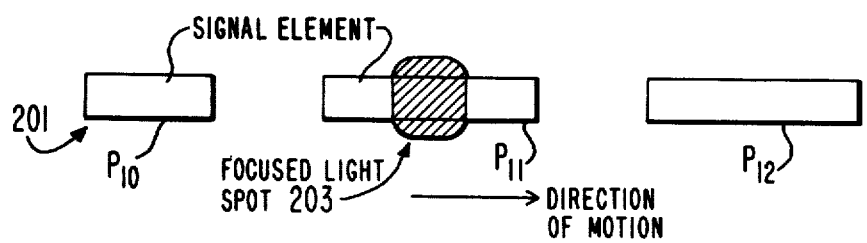
Fig. 9.

OPTIMAL POLARIZATION FOR THE OPTICAL READOUT OF HIGH DENSITY VIDEO RECORDING

The present invention relates generally to novel playback systems employing optical techniques for playback of high density information records, and particularly to playback systems and optical techniques therefor which may be employed to recover video information from the spiral track of a video disc record.

The recorded signals on a video disc are usually in the form of a series of pits with varying length and separation. The purpose of an optical readout scheme is to resolve the edges of the pits by means of a focused light spot so that the spatial separation between the pit edges can be converted into frequency-modulated electrical signals while the disc is being rotated. At present, optical resolution of the pit may be accomplished by two different methods.

In one method, described in an article entitled, "The Optical Scanning System of the Philips 'VLP' Player", by G. Boushuis and P. Burgstede, Volume 33, No. 7, pp. 186-189 of the Philips Technical Review (1973) a single axial detector is used to collect the light diffracted by the video disc surface. In this detection scheme some of the light is diffracted out of the detector aperture as the focused spot moves over a pit edge. The resulting detector output drop is representative of the information recorded on the disc surface.

In the second method, described in U.S. Pat. No. 4,065,786 issued on Dec. 27, 1977 to W. C. Stewart, a split detector (i.e., differential phase detector) is used in place of a single detector. Instead of detecting the intensity drop of the light reflected from the disc surface, the difference in diffracted light intensity between the right and left halves (defined relative to the pit edge) of the split detector is construed as the signal. When the Stewart approach is used to read out high density video recordings the resolution for a given spot size is enhanced.

When the focused spot size, defined as $\lambda/2n$, where n is the numerical aperture of the focusing lens and $\lambda$ is the wavelength of the readout beam, and the pit length are much larger than 80, and the pit depth is much smaller than $\lambda$, the two detection methods described above are adequate for resolving the recorded video signals. Moreover, the detected signal is insensitive to the polarization of light. However, when the length and separation of the pits or the focused spot size become comparable to $\lambda$, such as required in the optical readout of very high density video or data recordings, the resolution falls off.

In accordance with the principles of the present invention the signal strength (output of the light detection means) and edge resolution of the signal pit can be effectively enhanced by proper orientation of the polarization of the playback light beam incident on the disc surface. In further accordance with the principles of the present invention when using a differential phase detector of the Stewart system, proper polarization orientation provides a readout signal having high signal strength and no polarity change for signal depth variations up to $(\frac{1}{4}) \lambda$.

Pursuant to one aspect of the present invention an optical playback system for recovering data from a record is provided. In this system data is recorded in an elongated information track on the record in the form of a succession of depressed areas having various lengths alternating along the length of the information track with relatively non-depressed areas. The system includes a light source which emits a linearly-polarized coherent light beam having a wavelength which is comparable to the shortest of said various lengths. Further, the system includes means for focusing said light beam to a spot on the information track and for orienting the longitudinal axis of said light beam such that the longitudinal axis is substantially perpendicular to a surface of the record. Interposed between the light source and the information track is a means for orienting the polarization of the light spot on the information track. During readout, relative motion between the information track and the focused light spot is established. Additionally the system comprises light detection means, means for rotating the orienting means and means for indicating the signal strength of the light detection means. The light detection means, which is responsive to the diffraction of the focused light by the information track during the occurrence of the relative motion, develops electrical signals representative of the recorded data. The polarization of the light spot at the record surface is rotated around the longitudinal axis of the light beam by rotating the orienting means. In response to the output of the light detection means, the indicating means indicates the signal strength of the light detection means.

In the accompanying drawing:

FIG. 4a shows a side view of a signal pit having a length equal to four wavelengths of the incident light beam;

FIGS. 4b and 4c show signal profiles of a single axial detector for the signal pit of FIG. 4a of depth equal to one eighth and one quarter the wavelength of the incident light beam respectively;

FIG. 5a shows a side view of a signal pit having a length equal to the wavelength of the incident light beam;

FIGS. 5b and 5c show signal profiles of a differential phase detector for the signal pit of FIG. 5a of depth equal to one eighth and one quarter the wavelength of the incident light beam respectively;

FIG. 6a shows a side view of a signal pit having a length equal to four wavelengths of the incident light beam;

FIGS. 6b and 6c show signal profiles of a differential phase detector for the signal pit of FIG. 6a of depth equal to one eighth and one quarter the wavelength of the incident light beam respectively;

FIG. 7a shows a side view of a signal pit having a length equal to one half the wavelength of the incident light beam;

FIGS. 7b and 7c show signal profiles of a single axial detector for the signal pit of FIG. 7a of depth equal to one quarter and one eighth the wavelength of the incident light beam, respectively;

FIG. 8a shows a side view of a signal pit having a length equal to one half the wavelength of the incident light beam;

FIGS. 8b and 8c show signal profiles of a differential phase detector for the signal pit of FIG. 8a of depth equal to one quarter and one eighth the wavelength of the incident light beam respectively;

FIG. 9 is a top view of a portion of an information track illustrating signal pits having a width which is less than the effective diameter of the focused light spot;

Figure 1:
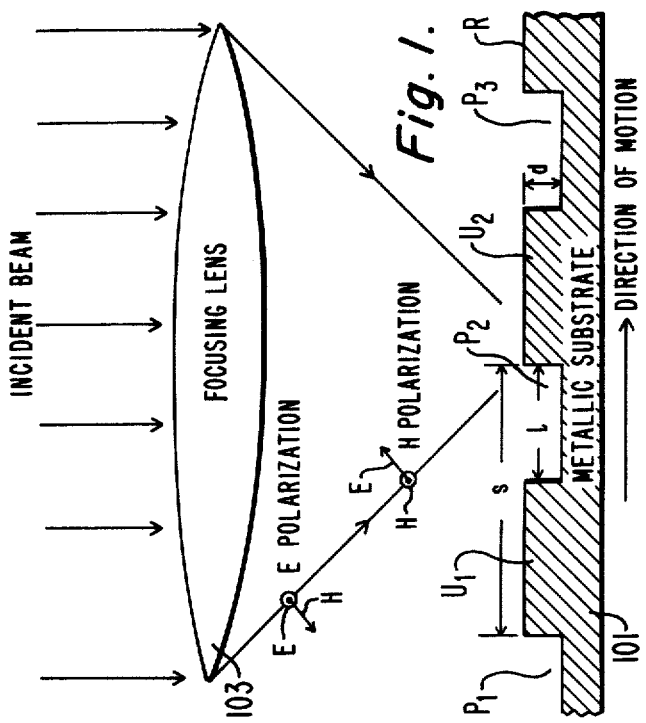
FIG. 1 is a cross-sectional view of a portion of an information track being irradiated with a focused light spot.

Referring to FIG. 1, a cross-sectional view of a portion of a record 101, taken through the center of the information track, is shown. The record 101 may be of a metallic or other reflective material. The information track comprises a succession of spaced pits $P_1$, $P_2$ and $P_3$ separated by regions U1 and U2 in which the surface of the record 101 is undisturbed. The depth of each pit is shown as being equal to d, the length of pit $P_2$ is shown as being equal to l, and the separation between pit $P_1$ and $P_2$ is shown as being s. During readout a focusing lens 103 is arranged above the record 101 such that an incident readout beam is focused to a spot on the record surface R. Relative motion is established between the focused spot and record such that light diffracted by the record surface passes back through the focusing lens 103 to a single axial or differential phase detector which converts the diffracted light into frequency-modulated electrical signals representative of the information stored on the record surface in the form of pits.

In FIG. 1 two distinct polarizations of light are shown. The E polarization is defined as having an E vector perpendicular to the plane of the paper, or to the direction of motion of the record. The H polarization, on the other hand, is defined as having the H vector perpendicular to the plane of the paper.

Figure 2:
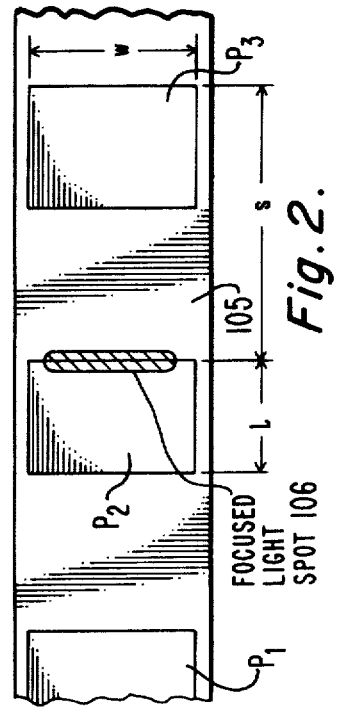
FIG. 2 is a top view of a portion of the information track of FIG. 1 illustrating signal pit width, length and separation.

FIG. 2 shows the top view of a portion of the record 101 of FIG. 1 having an information track 105. For purposes of illustration, the information track 105 is shown as having pits $P_1$, $P_2$ and $P_3$ with length l, separation s, and width w. A focused light spot 106 having an oblong shape is shown at the edge of pit $P_2$.

Figure 3A:
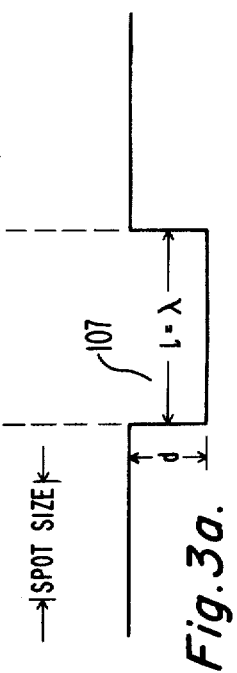
FIG. 3a shows a side view of a signal pit having a length equal to the wavelength of the incident light beam.
Figure 3B:
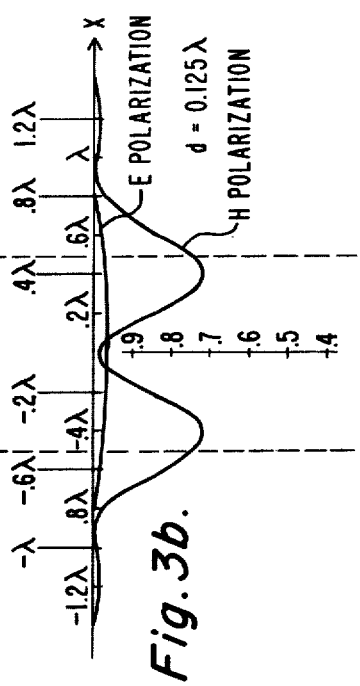
FIGS. 3b and 3c show signal profiles of a single axial detector for the signal pit of FIG. 3a of depth equal to one eighth and one quarter the wavelength of the incident light beam respectively.
Figure 3C:
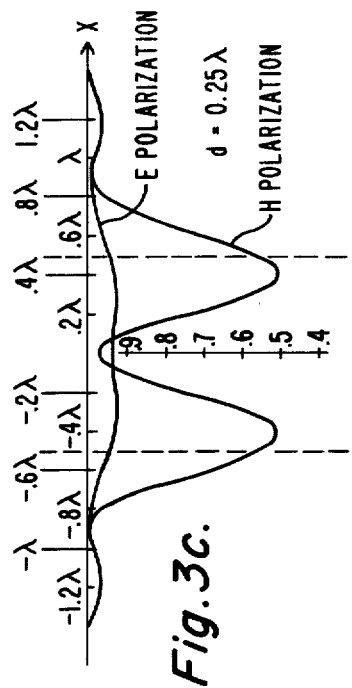

FIG. 3a shows a signal pit 107 having a length l equal to the wavelength of the readout light beam and a depth d. FIGS. 3b and 3c define the detected signal profile of a single axial detector for a signal pit depth of ⅛ and ¼ of the wavelength of the readout light beam respectively. In FIGS. 3b and 3c the signal profile is shown for the two polarizations of FIG. 1. The horizontal scale denotes the position of the center of the focus spot and the vertical scale denotes the detected light flux as a fraction of the total incident light flux.

An examination of FIGS. 3b and 3c reveals that the signal strength for the H polarization is approximately five times stronger than the signal strength for the E polarization. Moreover, the pit edges are easily resolved for the H polarization, whereas the pit edges for the E polarization are barely discernible.

FIG. 4a shows a signal pit 109 having a length l equal to four wavelengths of the readout light beam. The signal profiles of a single axial detector defined for two signal depths are shown in FIGS. 4b and 4c. Although the pit edges are resolvable for the E polarization for both signal depths, the signal strength for the H polarization is at least three times stronger. In general, it has been found that when the readout spot size is comparable to the wavelength of the readout light beam, the signal strength and resolution of pit edges are enhanced by orienting the readout beam such that the H vector is parallel to the surface R of the record and is perpendicular to the information track. It is thought that the physical reason for this enhancement is that the H polarized light is scattered more strongly by the steep pit edges than the E polarized light.

Referring to FIG. 5, FIG. 5a shows a signal pit 111, having a length l equal to the wavelength of the readout light beam. In FIGS. 5b and 5c signal profiles of a differential phase detector are defined for two signal depths (i.e., ⅛ and ¼ of the wavelength $\lambda$) and two polarizations (i.e., H and E polarizations). The horizontal scale of FIGS. 5b and 5c corresponds to the horizontal scale of FIGS. 3b and 3c while the vertical scale is calibrated such that "1" corresponds to the signal strength when the total light flux is incident on one side of a split detector. An examination of FIGS. 5b and 5c shows that the two polarizations are equally adequate for pit depths of less than 0.20 of the wavelength of the readout light beam, but that the E polarization is preferable when the pit depth exceeds 0.20 of a wavelength. Besides providing a stronger signal, the E polarization provides a signal which does not reverse in phase as the signal pit depth increases. As shown in FIGS. 5b and 5c the H polarization shows a phase reversal when the pit depth goes from ⅛$\lambda$ to ¼$\lambda$. Advantageously, by using the E polarization to read high density video recordings with a differential phase detector in cases in which the signal pit depth can vary, no phase reversal is introduced.

FIG. 6 shows the signal profile for a signal length l of four wavelengths and use of a differential phase detector. As shown in FIGS. 6b and 6c, it is also advantageous to read a signal pit of four wavelengths with an E polarized light beam for the same reasons mentioned in connection with FIG. 5.

The single axial detector response for the case where the signal length l is equal to one half the wavelength of the readout light beam and is smaller than the spot size (illustratively, a spot size equal to 0.62 of the wavelength of the readout light beam) is shown in FIG. 7. The loss of edge resolution in this case may be compared to the differential phase detector of FIG. 8 showing the resolution of the edges for the same signal length. The single axial detector does not resolve pit edges as well as the differential phase detector when the signal length is less than the spot size. This is, in fact, one of the reasons for the development of the differential phase detector for optical readout of high density information as described in the Stewart patent.

Referring to FIG. 9 a portion of a record having an information track 201 is illustrated. Pits $P_{10}$, $P_{11}$ and $P_{12}$ are spaced along track 201. A focused light spot 203 incident on the track 201 is arranged to overlap the pit perpendicular to the direction of motion. From the above description with reference to FIG. 7, it would be advantageous to use E polarized light with a single axial detector to read out information stored in an information track as described in FIG. 9.

Figure 10:
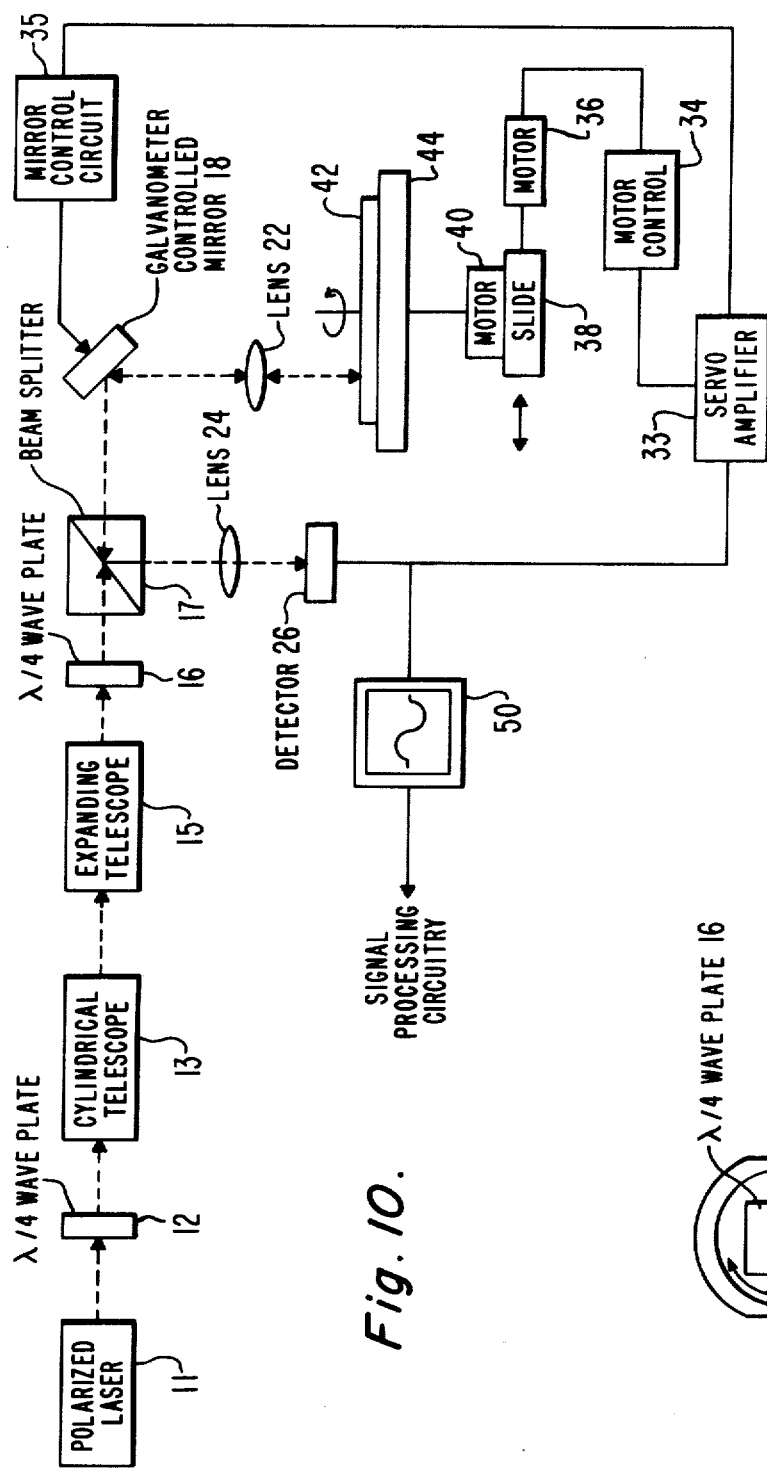
FIG. 10 illustrates, via a block diagram representation, an optical playback apparatus embodying the principles of the present invention.

For an illustration of the application of the principles of the present invention to the playback of a light-reflective record, reference is now made to FIG. 10, which shows a system for the playback of an information track appearing in a spiral configuration on a surface of a disc record 42. During playback, the disc 42 is supported on a turntable 44 in a position permitting the impingement upon the disc's information track of a coherent light beam focused thereon by a lens 22. Rotation of the turntable 44 by a motor 40 moves successive regions of the information track through the focused light beam location. In order that the focused light beam may track the successive convolutions of the spiral information track, a radial drive is provided for the turntable assembly. Illustratively, the desired radial drive is established by mounting the motor-driven turntable assembly upon a slide 38, which is driven in a radial direction by a motor 36 at a controlled rate appropriately related to the rate of rotation of disc 42.

A source of light in the playback system of FIG. 10, is provided by a laser 11. Illustratively, the laser 11 is of the helium-neon type, emitting a beam of coherent light of generally circular contour at a wavelength of approximately 0.663 micrometer. For purposes to be subsequently described, the output of laser 11 is a linearly-polarized light beam.

The circular-shaped light beam emanating from laser 11 enters cylindrical telescope 13 (incorporating an anamorphic lens system) and emerges reshaped as a light beam with a substantially elliptical contour. Interposed between the polarized laser 11 and the cylindrical telescope 13 is a quarter-wave plate 12. The optical axis of the quarter-wave plate 12 is arranged such that the light beam from laser 11 emerges from the quarter-wave plate 12 circularly polarized. The circularly-polarized elliptical beam from the cylindrical telescope 13 then enters the adjacent expanding telescope 15 and emerges with no change in shape or polarization but now appears as an enlarged elliptical beam. This enlarged elliptical light beam enters the entrance face of a second quarter-wave plate 16 and is thereby changed to a linearly polarized light beam. This linearly polarized beam then enters beam splitter 17 and is transmitted to impinge upon the galvanometer-controlled mirror 18. The galvanometer-controlled mirror 18 totally reflects the light beam towrd the disc 42. Lens 22, interposed between galvanometer-controlled mirror 18 and disc 42, receives the elliptical light beam and focuses the beam to form an elliptical light spot on the track of disc 42, with the major axis of the elliptical light spot lying transverse to the track, and the half-intensity dimension of the spot along said major axis being less than the track width. Suitable means (not shown) may be associated with lens 22 to insure maintenance of proper spot focus on the information track, illustratively, such means may incorporate an appropriate air bearing between lens 22 and disc 42.

The impinging light beam is diffracted by the recorded data, appearing in the spiral track as a succession of depressed areas alternating along the length of the track with non-depressed areas, into at least three primary diffraction order cones of light, namely, the zero and the ± first order cones, each cone of light having an elliptical cross-sectional contour. The zero order cone is reflected from the track undeviated with respect to the incident light while the first order cones are reflected from the track at angles which deviate such that the two first order cones overlap the undeviated zero order cone in opposite regions of the latter. The reflected light, which is linearly polarized, is collected by lens 22.

The linearly-polarized reflected light impinges onto the galvanometer-controlled mirror 18 and is reflected thereby toward the beam splitter 17. The beam splitter 17 reflects the light in a direction orthogonal to the incident light path. This orthogonally-reflected light is focused by lens 24 onto a light-accepting region of a light detector 26.

Detector 26 may be either a single axial detector or a differential phase detector as described above. The primary purpose of detector 26 is to convert the light diffracted by the disc surface into frequency-modulated electrical signals which can be supplied to signal processing circuitry (not shown) for delivery to a display device such as a color television receiver.

Detector 26 also provides a tracking error signal representative of the sense and magnitude of miscentering when the light spot departs from the center of the track. The tracking error signal is routed to servo amplifier 33 which produces a control voltage which is illustratively used by two components of the playback signal. The control voltage is routed to motor control circuit 34 to provide control of motor 36 for course adjustments of the disc's track alignment and the focus spot, and to mirror control circuit 35 to provide control of the pivoting mirror 18 for precision adjustments of the lateral centering of the incident light beam with respect to the track.

Oscilloscope 50, interposed between the detector 26 and signal processing circuitry, provides an indication of the signal strength from detector 26. As described above, the detector signal strength is dependent upon the orientation of the polarization of the readout light beam incident on the disc surface.

The combination of quarter-wave plates 12 and 16 provide means for orienting the linear polarization of the light beam incident on the disc surface. The linearly-polarized light emanating from laser 11 is circularly polarized by quarter-wave plate 12. Passing the circularly-polarized light through the second quarter-wave plate 16 effects another change in polarization, i.e., the light beam emanating from quarter-wave plate 16 is linearly polarized. Rotation of quarter-wave plate 16 about its central axis effects a rotation of the linear polarization vector incident on the disc surface. As quarter-wave plate 16 is rotated, the indication of signal strength of detector 26, shown on the display of oscilloscope 50, will change. In general, quarter-wave plate 16 is oriented to provide maximum signal output from detector 26.

Figure 11:
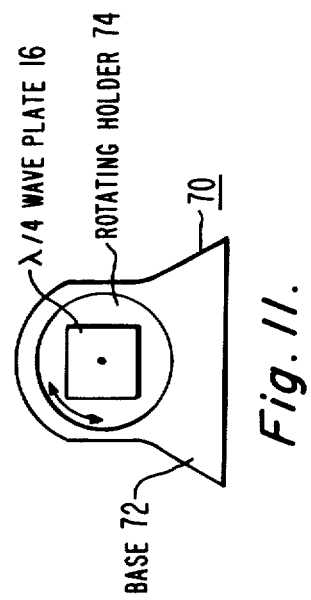
FIG. 11 illustrates a rotatable base for the quarter wave plate of FIG. 10.

Referring to FIG. 11, a mounting stand 70 for rotating quarter-wave plate 16 is shown. Mounting stand 70 comprises a rotatable holder 74 mounted on a base 72. Quarter-wave plate 16 of FIG. 10 is mounted onto the rotatable holder 74. During playback, rotatable holder 74 with quarter-wave plate 16 attached, is rotated to orient the linear polarization of the laser light beam incident on the disc surface to provide maximum signal strength at the detector 26 as previously mentioned.

Thus, the present invention provides a means for improving the readout of high density information tracks on optical disc records by adjusting the polarization of the light impinging on the record.

What is claimed is:

1. In an optical playback system for recovering from a disc record data recorded along an elongated information track as a succession of depressed areas having various lengths, alternating along the track elongation with relatively non-depressed areas, the apparatus comprising:
- a light source which emits a linearly-polarized coherent light beam having a wavelength which is comparable to the shortest of said various lengths
- means for focusing said light beam to a spot on said information track and orienting the longitudinal axis of said light beam such that said longitudinal axis is substantially perpendicular to a surface of said disc record;
- a first quarter-wave plate, interposed between said light source and said information track, having an optical axis oriented for providing a circularly-polarized light beam in response to said linearly-polarized light beam;
- a second quarter-wave plate, interposed between said first quarter-wave plate and said information track, for providing a second linearly-polarized light beam in response to said circularly-polarized light beam;
- means for establishing relative motion between said information track and said focused light spot;
- light detection means, responsive to light diffracted by said information track during the occurrence of said relative motion, for developing electrical signals representative of said recorded data;
- means for rotating said second quarter-wave plate such that the polarization of said light spot is rotated around said longitudinal axis; and
- means, responsive to said light-detection means, for indicating the signal strength of said light detection means.

2. In an optical playback system for recovering from a disc record data recorded along an elongated information track as a succession of depressed areas having various lengths, alternating along the track elongation with relatively non-depressed areas, the apparatus comprising:
- a light source which emits a linearly-polarized coherent light beam having a wavelength which is comparable to the shortest of said various lengths;
- means for focusing said light beam to a spot on said information track and orienting the longitudinal axis of said light beam such that said longitudinal axis is substantially perpendicular to a surface of said disc record;
- a first quarter-wave plate, interposed between said light source and said information track, having an optical axis oriented for providing a circularly-polarized light beam in response to said linearly-polarized light beam;
- a second quarter-wave plate, interposed between said first quarter-wave plate and said information track, for providing a second linearly-polarized light beam in response to said circularly-polarized light beam;
- means for establishing relative motion between said information track and said light spot;
- light detection means, responsive to light diffracted by said information track during the occurrence of said relative motion, for developing electrical signals representative of said recorded data;
- means, responsive to the light diffracted by said information track, interposed between said second quarter-wave plate and said information track, for deflecting light diffracted by said information track to said light detecting means;
- means for rotating said second quarter-wave plate and said deflecting means such that the polarization of said light spot is rotated around said longitudinal axis; and
- means, responsive to said light detection means, for indicating the signal strength of said light detection means.

* * * * *